United States Patent
Gean et al.

(10) Patent No.: US 11,057,836 B1
(45) Date of Patent: Jul. 6, 2021

(54) CALL RE-ROUTING IN COLLABORATIVE MODE WHEN BATTERY IS LOW

(71) Applicant: MOTOROLA SOLUTIONS, INC., Chicago, IL (US)

(72) Inventors: Nissim Gean, Netanya (IL); Shay Avivi, Modiin (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/092,436

(22) Filed: Nov. 9, 2020

(51) Int. Cl.
| | |
|---|---|
| *H04W 52/02* | (2009.01) |
| *H04W 4/08* | (2009.01) |
| *H04W 4/80* | (2018.01) |
| *H04W 4/10* | (2009.01) |
| *H04W 88/06* | (2009.01) |
| *H04W 88/04* | (2009.01) |

(52) U.S. Cl.
CPC ......... *H04W 52/0261* (2013.01); *H04W 4/08* (2013.01); *H04W 4/10* (2013.01); *H04W 4/80* (2018.02); *H04W 88/04* (2013.01); *H04W 88/06* (2013.01)

(58) Field of Classification Search
CPC ..... H04W 52/0261; H04W 4/80; H04W 4/08; H04W 4/10
See application file for complete search history.

(56) References Cited

U.S. PATENT DOCUMENTS

| | | | | |
|---|---|---|---|---|
| 5,689,810 | A * | 11/1997 | Shaughnessy | H04W 4/08 455/436 |
| 5,761,193 | A * | 6/1998 | Derango | H04W 4/06 370/312 |
| 9,363,381 | B2 | 6/2016 | Klein et al. | |
| 9,572,184 | B1 * | 2/2017 | Erdogan | H04W 4/80 |
| 9,591,124 | B2 * | 3/2017 | Corretjer | H04W 4/90 |
| 9,906,991 | B1 | 2/2018 | Peddiraju et al. | |
| 10,750,327 | B2 * | 8/2020 | Patel | H04W 4/10 |
| 2015/0271339 | A1 * | 9/2015 | Klein | H04W 12/033 455/417 |
| 2020/0100069 | A1 * | 3/2020 | Yang | H04W 76/27 |
| 2021/0037545 | A1 * | 2/2021 | Antilla | H04W 52/0209 |

\* cited by examiner

*Primary Examiner* — David Bilodeau

(57) ABSTRACT

A method and apparatus for re-routing a call a when utilizing a collaborative mode of operation is provided herein. During operation, when a radio is operating in a collaborative mode, a battery level of the smart device will be monitored by the radio. If the associated smart device's battery is below a predefined threshold, the radio will be connected to a new talk-group via a standard narrowband network. As a consequence, each outgoing (or incoming) call from the radio over the new talkgroup on the narrowband network will be re-routed to the broadband network via the narrowband network (without utilizing the smart phone).

13 Claims, 6 Drawing Sheets

CALL RE-ROUTING IN COLLABORATIVE MODE WHEN BATTERY IS LOW

BACKGROUND OF THE INVENTION

Radios operating in a collaborative mode connect to a smart phone via a side-link, such as a Bluetooth™ connection, and can be used as a Remote Speaker Microphone (RSM) accessory for the smart phone. The smart phone uses the broadband network in order to communicate with other smart phones.

Currently, when utilizing a collaborative mode of operation, no special consideration is made by the radio when the smart phone's battery is low. In this case, collaborative mode communications may fail when the battery fails. Because of this, a need exists for call re-routing when utilizing a collaborative mode of communication with a smart phone having a low battery.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for re-routing a call a when utilizing a collaborative mode of operation is provided herein. During operation, when a radio is operating in a collaborative mode, a battery level of the smart device will be monitored by the radio. If the associated smart device's battery is below a predefined threshold, the radio will be connected to a new talk-group via a standard narrowband network. As a consequence, each outgoing (or incoming) call from the radio over the new talkgroup on the narrowband network will be re-routed to the broadband network via the narrowband network (without utilizing the smart phone).

Figure 1:
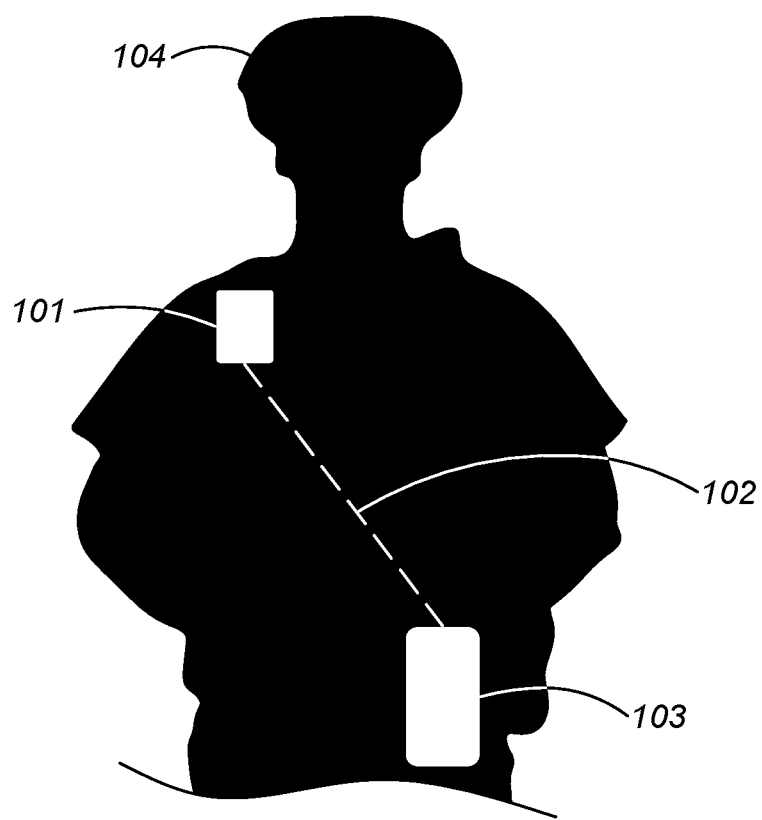
FIG. 1 illustrates an operational environment for the present invention.

Turning now to the drawings wherein like numerals designate like components, FIG. 1 is an operational environment for the present invention. As shown, officer 104 is equipped with two radios, namely radio 101 capable of narrowband operation with a narrowband network, and second radio 103 (referred to herein as a device, or smart device) capable of broadband operation with a broadband network. Radio 101 and smart device 103 are capable of communicating with each other via wired, or wireless link 102. In one embodiment of the present invention, link 102 is preferably a short-range communication link, such as a Bluetooth™ communications link. During operation, radio 101 may utilize link 102 and radio 101 to communicate to other devices over a broadband network. More specifically, radio 101 may receive user's 104 communication (e.g., voice) and route the communication via link 102 to smart device 103, which transmits the communication to other radios over a broadband network. Radio 101 is also capable of communicating with other devices over the narrowband network by direct communication with the narrowband network via no intermediary devices (i.e., without the use of device 103).

Figure 2:
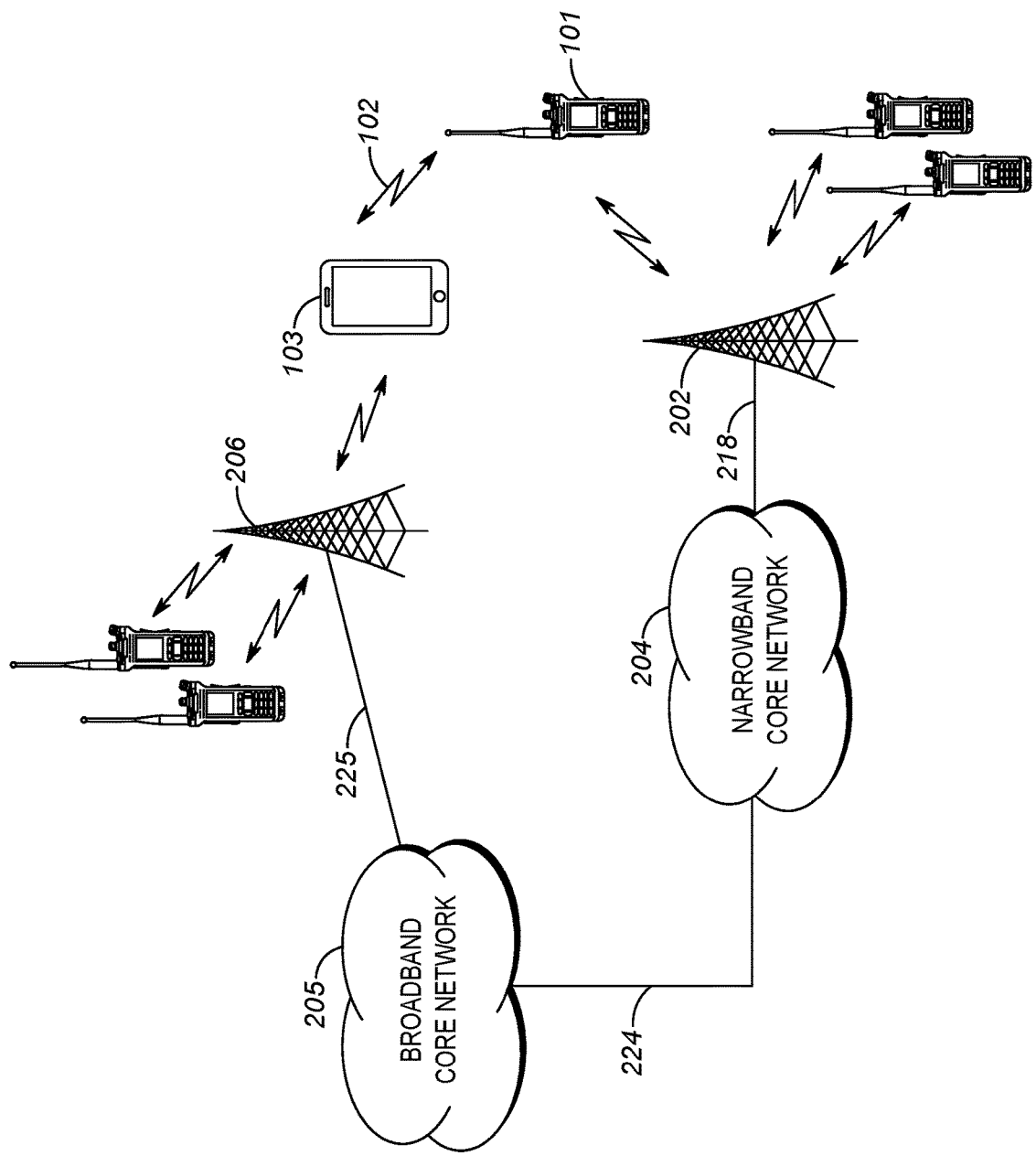
FIG. 2 illustrates an operational environment for the present invention.

FIG. 2 is a more-detailed depiction of the operational environment 200 for call re-routing when utilizing a collaborative mode of communication with a smart device having a low battery. The system of FIG. 2 is described in detail in U.S. patent Ser. No. 10/750,327, entitled METHOD FOR MULTIPLEXING MEDIA STREAMS TO OPTIMIZE NETWORK RESOURCE USAGE FOR PUSH-TO-TALK-OVER-CELLULAR SERVICE, and incorporated by reference herein.

As shown, environment 200 includes narrowband core network 204, device 103, radio 101, broadband core network 205, and communication links 225, 218, 224, and 102. One or more radio access points 202 is provided for accessing narrowband core network, while one or more broadband access points 206 is provided for accessing broadband core network 205.

Thus, as shown in FIG. 2, two separate networks exist, namely narrowband core network 204 for primarily carrying voice traffic from radios, and a high-speed broadband network 205 (e.g., Verizon, Spring, AT&T, . . . , etc.) for carrying high-speed data, including voice from radio 101 using device 103 as an intermediary device. (Device 103 is configured for communications over broadband network 205 utilizing access point 206).

Each access point 202, 206 includes typical access point elements such as base stations, base station controllers (BSCs), routers, switches, and the like, arranged, connected, and programmed to provide wireless service to user equipment (e.g., device 103 or radio 101) in a manner known to those of skill in the relevant art. Access point 202 may operate according to an industry standard land mobile radio (LMR), for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI.

Access point 206 may operate via any cellular-communications standard, such as, but not limited to the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Device 103 comprises any suitable computing and/or communication devices operable to engage in broadband wireless communication to access point 206 over an air interface as is known to those in the relevant art. Device 103 is also capable of communications with radio 101 through link 102. With this in mind, device 103 comprises any smart device (e.g., smart phone, tablet computer, . . . , etc.) capable of providing link 102 to radio 101 so that device 103 may be used as intermediary device enabling radio 101 to utilize network 205 during communications with other radios over broadband core network 205.

Radio 101 may be any suitable computing and/or communication device operable to engage in wireless communication over an air interface with narrowband core network 204 via a conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. As is evident, radio 101 is also capable of communications with device 103 through short-range communication link 102.

During operation, radio 101 may communicate with other radios 101 (only one radio 101 labeled in FIG. 2) via transmitting and receiving communications through network 204, network 205, or a combination of networks 204 and 205. For example, radio 101 may utilize broadband network 205 by using link 102 to relay any communications to smart device 103, which forwards them to broadband core network 205 via a high-speed communications link. Broadband core network 205 may forward the communication to other radios directly connected to network 205, or may forward the communication to narrowband core network 204 to be provided to other radios in communication with network 204.

As one of ordinary skill in the art will recognize, communications between radios 101 typically utilize push-to-talk (PTT). PTT is commonly employed by public safety personnel, air traffic controllers, emergency workers, construction site workers, and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices through networks 205 and/or 204, where the operators of those other devices hear the first operator speak through their device's speaker.

Communications utilizing PTT often employ talkgroups. More specifically, modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of Fire & Rescue by communicating over the fire and rescue talkgroup, and may communicate with members of law enforcement by communicating over the Law Enforcement talkgroup.

As mentioned above, when utilizing a collaborative mode of operation in prior-art systems, no special consideration is made when the smart device's battery is low. In order to address this issue, when utilizing a collaborative mode of operation, device 103 will periodically provide its battery level to radio 101 via link 102. Preferably, the battery level comprises a percentage of remaining power (e.g., 10% battery remaining), however, in alternate embodiments other metrics for battery level may be utilized (e.g., how many hours or minutes remaining for the battery).

When the battery level for device 103 is below a predetermined threshold, radio 101 will cease collaborative communications with device 103 and initiate communications to core network 204 via access point 202. Thus, all communications through broadband network 205 will cease in favor of communications through narrowband network 204. This is illustrated in FIG. 3 and FIG. 4.

Figure 3:
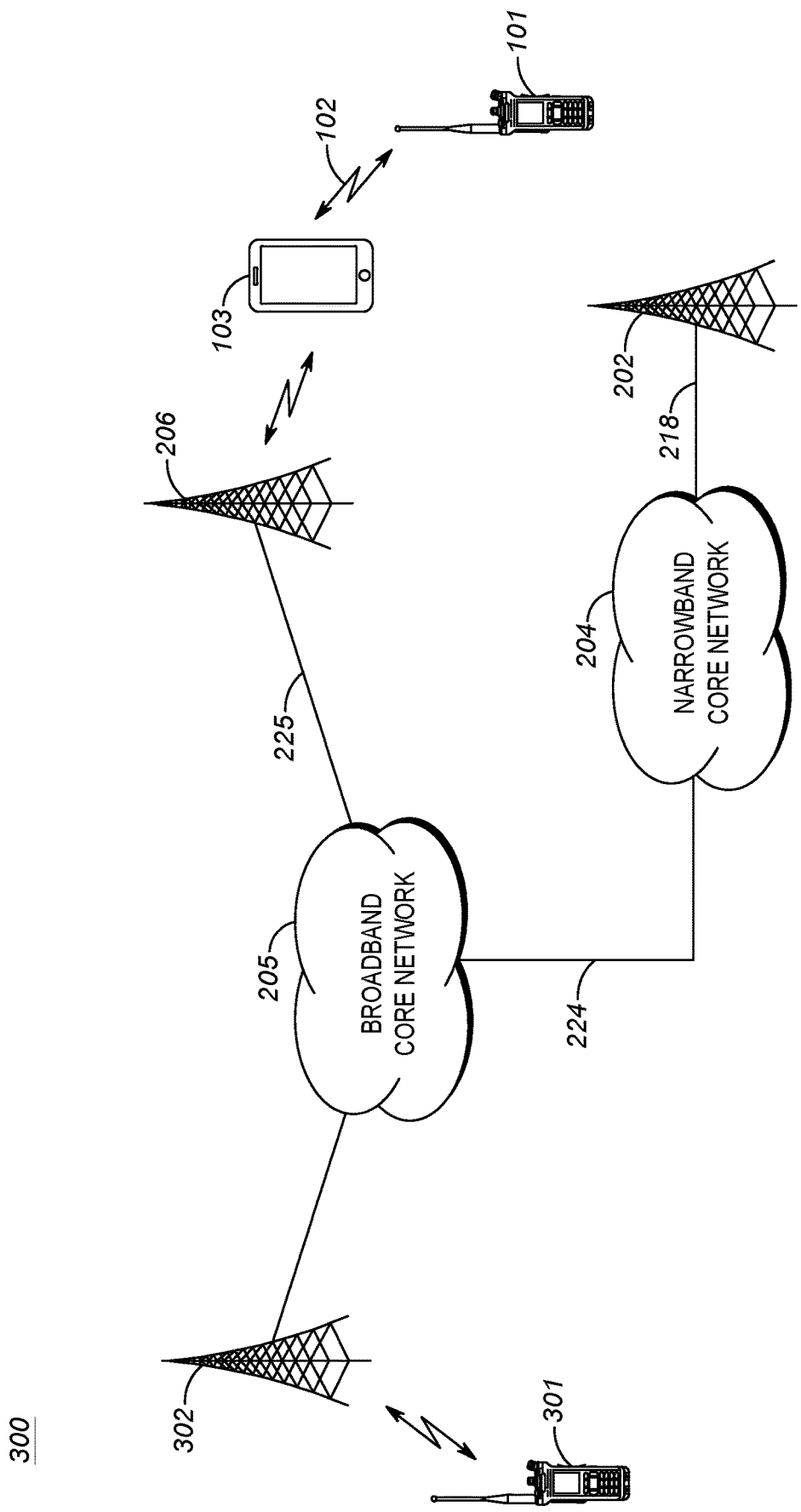
FIG. 3 illustrates communications using a collaborative mode.

As shown in FIG. 3, radio 101 is in communication with radio 301. Radio 101 is using collaborative communications by relaying all received voice communications from an officer (not shown) to device 103 via link 102. Device 103 transmits the voice communications through access point 206, broadband network 205, and access point 302, ultimately to radio 301.

As discussed, device 103 will periodically (e.g., once every minute) provide radio 101 with an indication of remaining battery life. When the battery life falls below a threshold, radio 101 will drop link 102 and utilize narrowband network 204 for continuing communications to radio 301. This is illustrated in FIG. 4.

Figure 4:
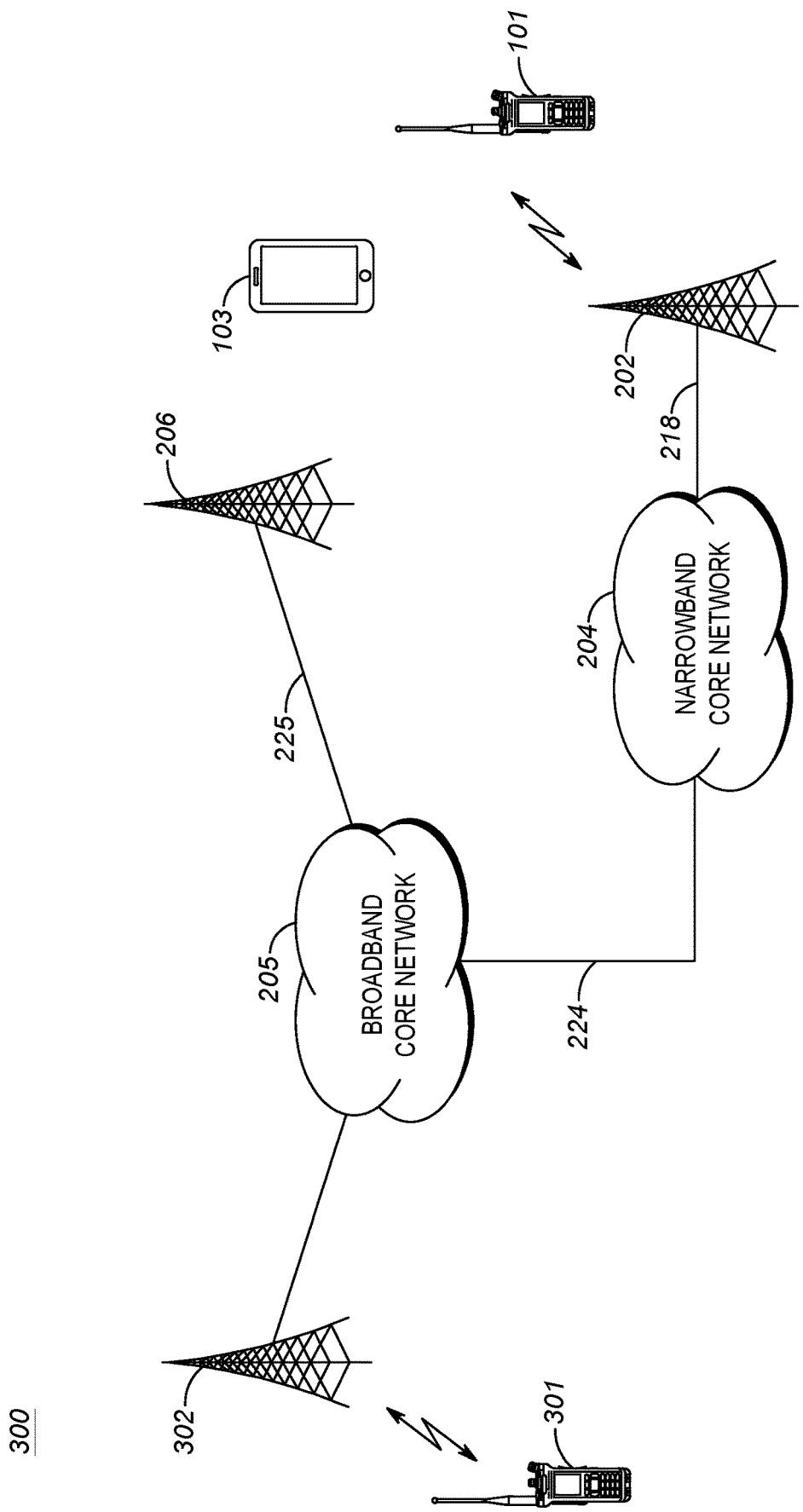
FIG. 4 illustrates communications using a newly-formed talkgroup over the narrowband communication system.

As shown in FIG. 4, radio 101 has dropped link 102 and now communicates wirelessly to access point 202. Communications flow through access point 202, narrowband core network 204, to broadband core network 205, access point 302, and ultimately to radio 301.

In order to facilitate communications through narrowband core network 204, communications between radio 101 and access point 202 will take place over a newly-created talkgroup. This is accomplished by radio 101 creating the new talkgroup by transmitting instructions to core network 204 to perform a "dynamic regrouping". As known in the art, with the dynamic regrouping feature, radio 101 can seamlessly cause itself to be added to a new talkgroup without any intervention from radio operators. When network 204 receives the regroup request, network 204 will create a new talkgroup specifically for radio 101, and add radio 101 to this talkgroup. Communications from radio 101 to access point 202 will then take place utilizing the new talkgroup. Preferably, radio 101 is the only mobile radio communicating on the newly-created talkgroup.

Thus, as is evident, a low battery in device 103 will trigger the creation of a new talkgroup between radio 101 and access point 202.

Figure 5:
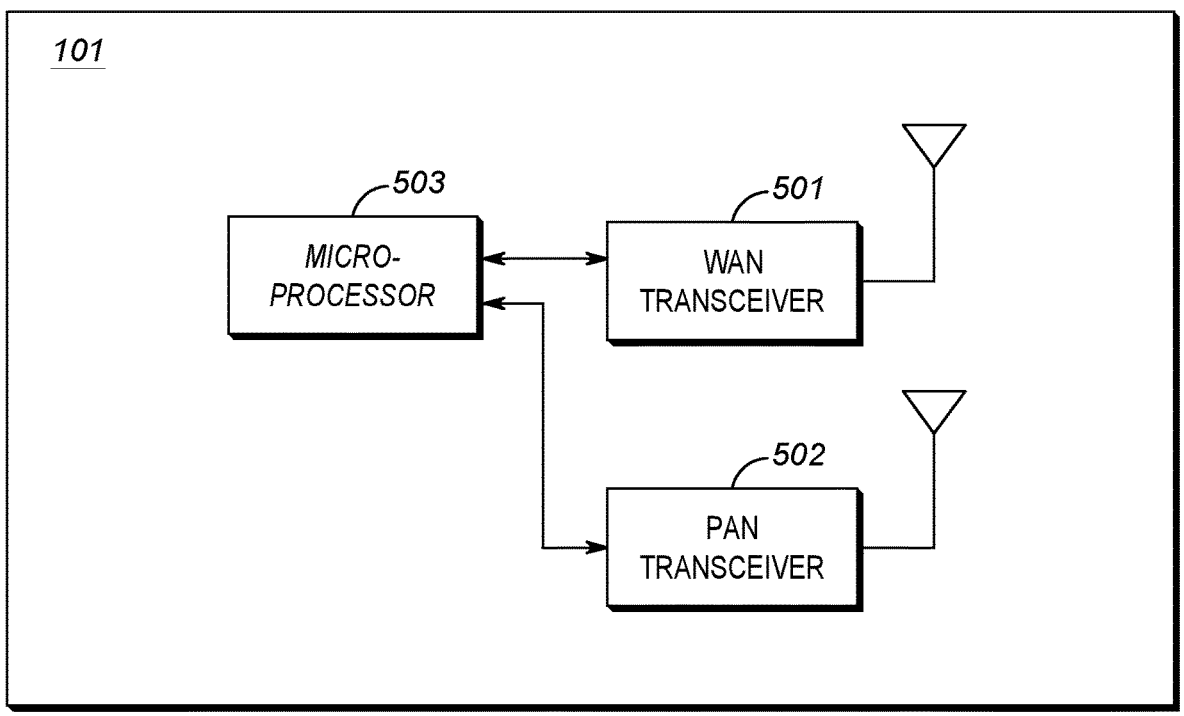
FIG. 5 is a block diagram of the radio of FIG. 3.

FIG. 5 is a block diagram of radio 101. As shown, radio 101 includes a wide-area-network (WAN) transceiver 501 (e.g., a transceiver that utilizes a public-safety communication-system protocol and core network 204), PAN transceiver 502 (e.g., a short-range transceiver), and logic circuitry 503. In other implementations, radio 101 may include more, fewer, or different components.

WAN transceiver 501 may comprise well known long-range transceivers that utilize any number of narrowband communication system protocols. (As one of ordinary skill in the art will recognize, a transceiver comprises both a transmitter and a receiver for transmitting and receiving data). For example, WAN transceiver 501 may be configured to utilize any public-safety protocol such as an APCO 25 network or the FirstNet broadband network.

PAN transceiver 502 may be well known short-range (e.g., 30 feet of range) transceivers that utilize any number of network system protocols. For example, PAN transceiver 502 may be configured to utilize Bluetooth communication system protocol, or a private 802.11 protocol. PAN transceiver 502 is utilized for radio 101 to communicate with device 103.

Logic circuitry 503 comprises a digital signal processor (DSP), general purpose microprocessor, a programmable logic device, or application specific integrated circuit (ASIC) and is configured to trigger the creation of a new talkgroup when the battery level of device 103 falls below a predetermined threshold. Additionally, logic circuitry 503 is configured to switch any active communications to other radios from the PAN transceiver (over the wideband network) to the WAN transceiver (over the narrowband network) utilizing the newly-created talkgroup.

Thus, as shown, radio 101 comprises a wide-area network (WAN) transceiver 501 configured to communicate over a first network, and a personal area network (PAN) transceiver 502 configured to communicate over a second network by relaying communications through a second radio (i.e., device 103) in a collaborative mode of operation. Logic circuitry 503 is provided and configured to determine that a battery level of the second radio 103 is low. As discussed, this determination is preferably made by second radio 103 periodically providing a battery level through communications link 102. Logic circuitry 503 is also configured to trigger the creation of a new talkgroup on the first network based on the battery level of the second radio being low and switch any active communications from the second network to the first network based on the battery level of the second radio being low. As discussed the communications over the first network takes place utilizing the new talkgroup.

As discussed above, the first network preferably comprises a narrowband network, while the second network preferably comprises a wideband network. Additionally, logic circuitry 503 triggers the creation of the new talkgroup by sending a regroup command to the first network.

It should be noted that when the newly created talkgroup is utilized by radio 101, radio 101 is preferably the only mobile device utilizing the newly-created talkgroup. In other words, the newly-created talkgroup is specifically utilized for communications between radio 101 and access point 202 so that radio 101 may utilize the narrowband core network in relaying communications to the broadband core network.

Figure 6:
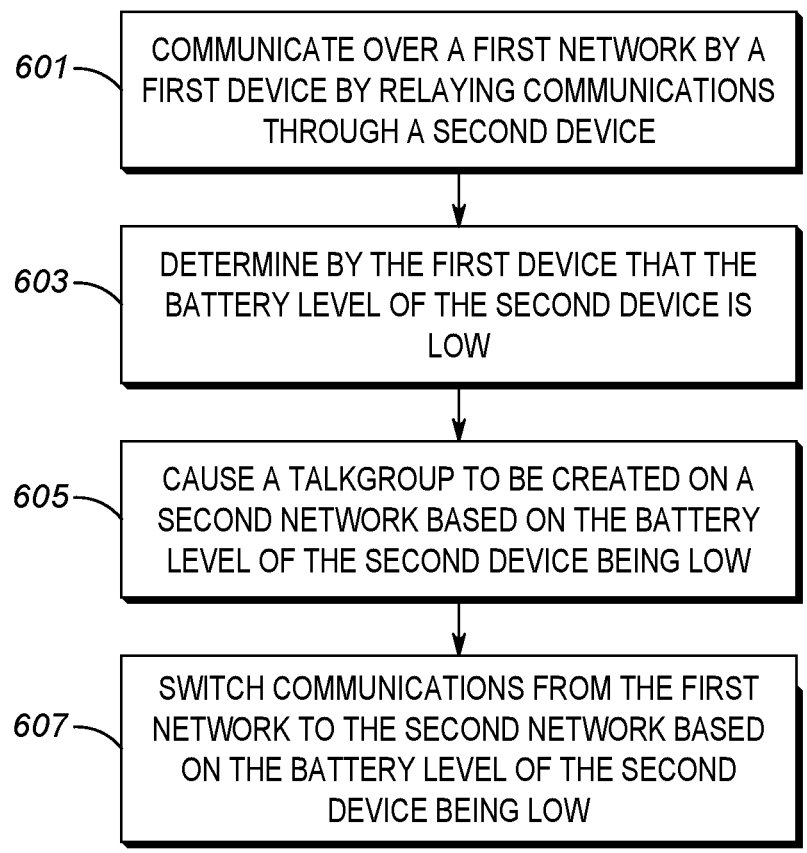
FIG. 6 is a flow chart showing operation of the radio of FIG. 5.

FIG. 6 is a flow chart showing operation of the radio of FIG. 5. The logic flow begins at step 601 where radio 101 is communicating over a first network 205 by a first device 101 by relaying communications through a second device 103. At step 603, logic circuitry 503 determines that the battery level of the second device 103 is low and at step 605 causes a talkgroup to be created on a second network 204 based on the battery level of the second device being low. Finally, at step 607, logic circuitry 503 switches communications from the first network (using the PAN transceiver) to the second network (using the WAN transceiver) based on the battery level of the second device being low. As discussed, the communications on the second network take place via the created talkgroup.

As discussed, the first network comprises a broadband network and the second network comprises a narrowband communications network, and the step of causing a talkgroup to be created comprises the step of sending a regroup command to the second network. Additionally, the first radio is preferably the only radio utilizing the created talkgroup when communicating over the second network. Finally, the second radio is configured to communicate over the first network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A radio comprising:
a wide-area network (WAN) transceiver configured to communicate over a first network;
a personal area network (PAN) transceiver configured to communicate over a second network by relaying communications through a second radio;
logic circuitry configured to:
determine that a battery level of the second radio is low;
trigger a creation of a new talkgroup on the first network based on the battery level of the second radio being low; and
switch communications from the second network to the first network based on the battery level of the second radio being low, wherein the communications over the first network takes place utilizing the new talkgroup.

2. The radio of claim 1, wherein the first network comprises a narrowband network.

3. The radio of claim 1, wherein the second network comprises a broadband network.

4. The radio of claim 1, wherein the logic circuitry triggers the creation of the new talkgroup by sending a regroup command to the first network.

5. The radio of claim 1 wherein the radio is an only radio utilizing the newly-created talkgroup when communicating over the first network.

6. The radio of claim 1, wherein the second radio is configured to communicate over the second network.

7. A method comprising the steps of:
communicating over a first network by a first radio by relaying communications through a second radio;
determining by the first radio that a battery level of the second radio is low;
causing a talkgroup to be created on a second network based on the battery level of the second radio being low;
switching communications from the first network to the second network based on the battery level of the second radio being low, wherein the communications on the second network take place via the created talkgroup.

8. The method of claim 7 wherein the first network comprises a broadband network.

9. The method of claim 8, wherein the second network comprises a narrowband communications network.

10. The method of claim 7 wherein the step of causing a talkgroup to be created comprises the step of sending a regroup command to the second network.

11. The method of claim 7 wherein the first radio is an only radio utilizing the created talkgroup when communicating over the second network.

12. The method of claim 7, wherein the second radio is configured to communicate over the first network.

13. A method comprising the steps of:
communicating over a first network by a first radio by relaying communications through a second radio;
determining by the first radio that a battery level of the second radio is low;
causing a talkgroup to be created on a second network based on the battery level of the second radio being low;
switching communications from the first network to the second network based on the battery level of the second radio being low, wherein the communications on the second network take place via the created talkgroup;
wherein the first network comprises a broadband network;
wherein the second network comprises a narrowband communications network;
wherein the step of causing a talkgroup to be created comprises the step of sending a regroup command to the second network;
wherein the first radio is the only radio utilizing the created talkgroup when communicating over the second network; and
wherein the second radio is configured to communicate over the first network.

* * * * *